United States Patent [19]

Pacis et al.

[11] 4,260,176
[45] Apr. 7, 1981

[54] WHEEL SUSPENSION STRUT

[75] Inventors: Arnold F. Pacis, Orchard Lake; Ralph A. Youngdale, Union Lake, both of Mich.

[73] Assignee: Chrysler Corporation, Highland Park, Mich.

[21] Appl. No.: 3,319

[22] Filed: Jan. 15, 1979

[51] Int. Cl.³ .............................................. B60G 11/52
[52] U.S. Cl. ................................. 280/668; 267/20 A; 280/692
[58] Field of Search ............... 280/668, 692, 696, 662; 267/20 A

[56] References Cited

U.S. PATENT DOCUMENTS 3,346,272  10/1967  Smith ...................................... 280/668
3,954,257  5/1976   Keijzer .................................... 280/668

Primary Examiner—John J. Love
Assistant Examiner—John A. Carroll
Attorney, Agent, or Firm—Newtson & Dundas

[57] ABSTRACT

An improved strut especially for independent wheel suspension in motor vehicles, includes a jounce bumper formed of a resilient material bonded to a rigid stop member carried for movement with the rod member of the strut. The bumper includes a tapered central cavity to enhance uniform outward deformation in compression and provides means for carrying a dust shield to protect the exposed sliding surface of the rod.

8 Claims, 2 Drawing Figures

WHEEL SUSPENSION STRUT

BACKGROUND OF THE INVENTION

1. Field of Invention

The present invention relates generally to independent strut-type suspension systems for vehicles and more particularly to jounce bumpers employed therein.

2. Description of the Prior Art

It is well known in the automotive suspension art to provide resilient cushions or bumpers to damp overtravel excursions of strut components. Exemplary of such devices is that shown in U.S. Pat. No. 3,346,272 to Smith and that shown in U.S. Pat. No. 4,111,456 to Arnold et al.

Such prior art devices have often been of unduly complex shape tending to increase manufacturing costs and to give rise to problems in design for reliability. The prior art devices have further been dependent on other suspension components to actually limit travel in the direction compressing the bumper.

SUMMARY OF THE INVENTION

Responsive to the deficiencies in the prior art, it is an object of the present invention to provide a jounce bumper that is simple and economical to produce.

It is another object to provide a jounce bumper with an integrally assembled suspension stop.

These and other objects are fully met in the improved strut of the present invention which includes a generally cylindrical cushioning member bonded to a rigid stop member through which it is advantageously carried by another operative component of the strut.

BRIEF DESCRIPTION OF THE DRAWINGS

These and other objects will be apparent to those skilled in the vehicle suspension arts upon reading the following detailed description with reference to the accompanying drawing in which.

DESCRIPTION OF THE PREFERRED EMBODIMENT

Figure 1:
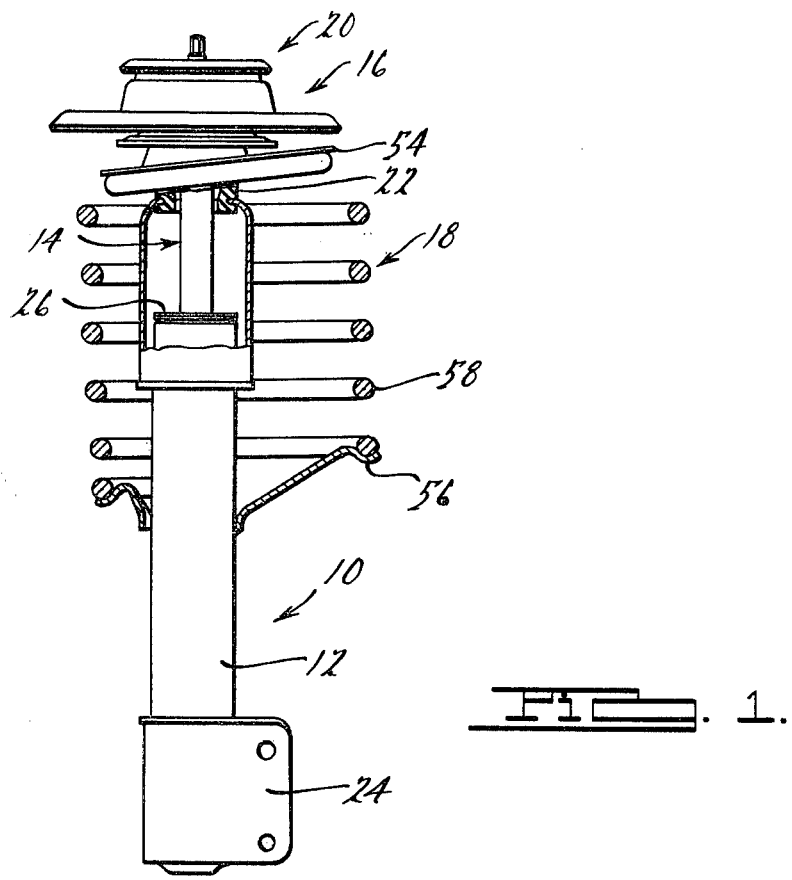
FIG. 1 is a partially cross sectioned elevational view of the strut of the present invention.

Referring first to FIG. 1, a suspension strut 10 for a vehicle independent wheel suspension system is illustrated as comprising generally a tubular housing 12, a rod member 14 telescopingly received in the housing 12, a resilient mounting assembly 16, a coil spring assembly 18, a rebound bumper assembly 20, and a jounce bumper assembly 22.

The tubular housing assembly 12 and the rod member 14 cooperate in a known manner to function as a hydraulic spring action modifier for vehicle suspension. The housing assembly 12 includes mounting means, such as the plate indicated at 24, adapted to be connected to a wheel of a vehicle. Its upper terminus, as viewed in FIG. 1, provides an annular face 26 surrounding the rod member.

Figure 2:
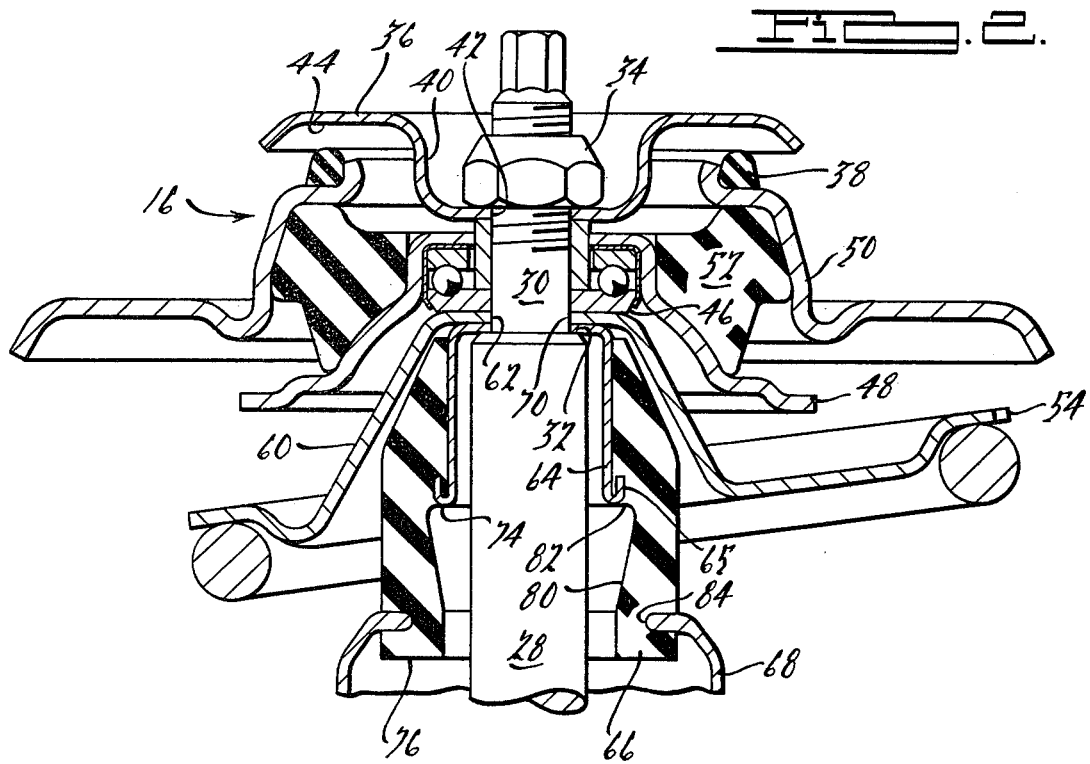
FIG. 2 is an enlarged cross sectional view showing the invention bumper assembly in its installed position.

The rod member 14, as may best be seen in FIG. 2, includes a lower portion 28 telescopably received in the housing 12, an upper threaded portion 30, and a shoulder 32 formed therebetween. A nut 34 or the like is received on the threaded portion 30 for axially retaining the mounting assembly 16, the spring assembly 18, the rebound bumper assembly 20, and the jounce bumper assembly 22 with respect to the rod 14.

The rebound bumper assembly 20 includes a rebound retainer 36 and a bumper ring 38. The rebound retainer 36 is generally disc shaped and includes a central depression 40 through which is formed a central aperture 42 whereby the rebound retainer 36 is received over threaded portion 30 of the rod member 14. The bumper ring 38 is formed of a resilient material and is carried on the mounting assembly 16, protruding upwardly therefrom to cushion downward travel (referred to in the trade as rebound travel) of the rod member 14 upon contact with the lower surface 44 of rebound retainer 36.

The resilient mounting assembly 16 is of a type favored in the production of MacPherson-type suspension systems and is here described for illustrative purposes only since the present invention stands independent of its structural features. The mounting assembly is illustrated as including a conventional thrust bearing 46 abuttingly engaging the rebound retainer 36, a centrally apertured bearing retainer 48 for carrying the bearing 46, a mounting plate 50 secured to the vehicle body or frame (not shown) in a conventional manner, and a resilient isolator 52 interposed between the bearing retainer 48 and the plate 50.

The spring assembly 18 includes upper and lower seat members 54, 56 and a coil spring 58. Lower seat member 56 is fixedly secured, as by welding, to the housing 12; and the upper seat member 54, which includes a central projection 60 for enhancing design compactness, includes a through bore 62 for assembly in close fitting relationship over the threaded portion 30 of rod member 14.

Jounce bumper assembly 22 includes a stop member 64 and a cushion member 66 and preferably carries a dust shield member 68 for preventing contamination of the telescoping rod and housing members 14, 12.

The stop member 64 is preferably formed as a rigid cup-shaped member having an aperture 70 received in close fitting relationship over the rod threaded portion 30 to place the stop member 64 in abutting relationship with the shoulder 32. The cushion member 66 is generally cylindrical, being tapered at 72 to conform to the spring seat projection 60, and is formed of a suitable resilient material such as rubber. It is bonded to the outer periphery stop member 64, axial retention being insured by the provision of an upturned flange portion 65 formed on the stop 64. It extends unsupported downwardly from the bottom 74 of the stop member 64 toward the annular face 26 of the housing 12, terminating in a flat annular face 76. The inner diameter 78 of the cushion member 66 includes an outward tapering portion 80 terminating in a generous radius at 82 adjacent the end 74 of the stop member 64. An annular groove 84 is formed in the outer periphery of the cushion member 64 for carrying the dust shield 68.

That the strut construction heretofore described is advantageous may be appreciated by considering its operation in a high jounce mode of operation. During such operation, relative wheel and frame or body movement can drive the top face 26 of housing 12 and the bottom face 76 of bumper assembly 22 into contact. At this point, the cushioning member 66 adds in series to the overall suspension system spring rate normally applied by operation of the rod 14, housing 12, and spring 58. Uniformity in the increase in resistance of the cushion member 66 to compression from further travel is aided by its simple cylindrical configuration and the provision of the tapered bore portion 80, which tends to ensure uniform outward deformation. Travel is finally limited when the housing face 26 abuts the stop member 64, whose length may be chosen so that no other system component is mechanically stopped at this point.

While only one embodiment of the present invention has been described, others may be possible without departing from the scope of the appended claims.

What is claimed is:

1. In a suspension strut for an independent wheel suspension system of an automotive vehicle, the strut being of the type having two relatively telescopable members, one securable to a fixed portion of the vehicle and the other securable to a wheel of the vehicle, an improved jounce bumper assembly comprising:
   A. a rigid stop member carried axially fast in surrounding relationship with one of said telescopable members and having a bottom surface juxtaposed with an upper surface of said other telescopable member; and
   B. a resilient cushion member bonded to said stop member in surrounding relationship and having a cushioning portion extending axially therefrom beyond said stop member bottom surface toward the other of said telescopable members;
   whereby after movement of said telescopable members with respect to each other to a position wherein the other telescopable member contacts said cushioning portion further movement is resiliently retarded until said other telescopable member upper surface directly contacts said stop member bottom surface whereupon movement substantially ceases.

2. A bumper assembly as defined in claim 1 and further comprising:
   C. means defining an annular groove in the outer periphery of said cushion member; and
   D. a cup-shaped dust shield member mounted in said groove and encompassing the outer periphery of said other telescopable member.

3. A bumper assembly as defined in claim 1 and further comprising:
   E. means defining an enlarged central cavity in said cushion member in axial registration with said cushioning portion; and
   F. means defining an annularly extending radius at an axial position in said cavity adjacent said stop member.

4. A bumper assembly as defined in claim 3 wherein said cavity includes a radially outward tapering portion whereby distortion of said cushion member during said resiliently retarded movement is in a radially outward direction.

5. A strut assembly for an independent wheel suspension system of a motor vehicle comprising:
   A. a tubular housing adapted to be secured to a wheel of the vehicle;
   B. a rod member telescopically received in said housing and extending outwardly therefrom;
   C. means axially secured to said rod member adjacent the free end thereof for resiliently mounting said rod member in a fixed portion of the vehicle;
   D. spring means interposed between said housing and said mounting means; and
   E. a bumper assembly axially secured to said rod member adjacent said mounting means and including:
      1. a generally cup-shaped rigid stop member carried in surrounding relationship for axial movement with said rod member and having a bottom surface juxtaposed with an upper surface of said housing; and
      2. a resilient generally cylindrical cushion member bonded to said stop member and having a cushioning portion extending axially therefrom beyond said stop member bottom surface toward said housing;
   Whereby upon contact of said cushioning portion and said housing further movement of said rod member inwardly with respect to said housing is resiliently retarded and upon direct contact of said housing upper surface with said stop member bottom surface, said movement is substantially prevented.

6. A strut assembly as defined in claim 5 wherein said bumper assembly further includes:
   3. means defining an annular groove in the outer periphery of said cushion member; and
   4. a cup-shaped dust shield member mounted in said groove and encompassing the outer periphery of said housing.

7. A strut assembly as defined in claim 5 wherein said bumper assembly further includes means defining an axially extending bore through said cushion member, said bore having a radially outwardly tapered portion having an enlarged radiused surface adjacent said stop member whereby radially outward distortion of said cushion member during said resiliently retarded movement is enhanced.

8. A strut assembly for an independent wheel suspension system of a motor vehicle comprising:
   A. a tubular housing adapted to be secured to a wheel of the vehicle;
   B. a rod member telescopically received in said housing and extending outwardly therefrom;
   C. means axially secured to said rod member adjacent the free end thereof for resiliently mounting said rod member in a fixed portion of the vehicle;
   D. spring means interposed between said housing and said mounting means; and
   E. a bumper assembly axially secured to said rod member adjacent said mounting means and including:
      1. a generally cup-shaped rigid stop member carried in axially fast surrounding relationship for axial movement with said rod member and including a bottom surface abuttingly engageable in directly contacting relationship with said housing to form a rigid stop connection between said housing and said mounting means; and
      2. a resilient generally cylindrical cushion member bonded to said stop member in surrounding relationship and having a cushioning portion extending axially therefrom beyond said stop member bottom surface toward said housing, said cushioning portion being abuttingly engageable with said housing to resiliently retard axial motion of said housing toward said mounting means until said housing contacts said stop member bottom surface whereupon further motion of said housing toward said mounting means is prevented.

* * * * *